United States Patent [19]

Hooper

[11] Patent Number: 4,810,050
[45] Date of Patent: Mar. 7, 1989

[54] OPTICAL INVERTER AND LOGIC DEVICES USING SAME WITH BUFFER LIMITED ELECTRICAL INTERFACE

[75] Inventor: Raymond C. Hooper, Ipswich, England

[73] Assignee: British Telecommunications public limited company, Great Britain

[21] Appl. No.: 6,668

[22] PCT Filed: May 21, 1986

[86] PCT No.: PCT/GB86/00288
§ 371 Date: Jan. 12, 1987
§ 102(e) Date: Jan. 12, 1987

[87] PCT Pub. No.: WO86/07166
PCT Pub. Date: Dec. 4, 1986

[30] Foreign Application Priority Data

May 24, 1985 [GB] United Kingdom ........... 8513192

[51] Int. Cl.⁴ .................................. G02B 6/12
[52] U.S. Cl. ........................... 350/96.14; 350/96.11
[58] Field of Search ............... 350/96.11, 96.13, 96.14

[56] References Cited

U.S. PATENT DOCUMENTS 2,936,380  5/1960  Anderson ........................ 250/225
3,781,081 12/1973  Rokos ............................ 350/96 WG

FOREIGN PATENT DOCUMENTS 0222820 12/1984 Japan ................... 350/96.11
0263126 12/1985 Japan ................... 350/96.11
0263926 12/1985 Japan ................... 350/96.11
0042619  3/1986 Japan ................... 350/96.11
0042620  3/1986 Japan ................... 350/96.11
0086738  5/1986 Japan ................... 350/96.11
0088232  5/1986 Japan ................... 350/96.11
0088233  5/1986 Japan ................... 350/96.11
0121030  6/1986 Japan ................... 350/96.11

OTHER PUBLICATIONS

Taylor, "Electro-Optic Technique for Adding Binary Numbers", Elect: Letts, Jul. 24, 1975, vol. 11, No. 15, pp. 313–314.

Neyer et al., "Non Linear Electrooptical Oscillator Using an Integrated Interferometor", Sixth European Conference, Sep. 16–19, 1980, pp. 276–280.

Primary Examiner—Gene Wan
Attorney, Agent, or Firm—Nixon & Vanderhye

[57] ABSTRACT

An optical logic device comprises a source of substantially constant, incoherent, optical power. Optical signal output means such as a waveguide switch receives the optical power from the source and has two output ports. The waveguide switch is responsive to electrical control signals selectively to generate optical signals on its output ports. A photodetector detects the logical condition of an optical input signal and generates a corresponding electrical control signal for controlling the waveguide switch. The arrangement is such that the optical condition of the output port is the logical complement of the logical condition represented by the optical input signal.

11 Claims, 2 Drawing Sheets

4,810,050

OPTICAL INVERTER AND LOGIC DEVICES USING SAME WITH BUFFER LIMITED ELECTRICAL INTERFACE

BACKGROUND OF THE INVENTION

1. Field of the Invention

The invention relates to a optical logic devices and assemblies for carrying out a logic function on an incident optical signal.

2. Description of the Related Art

Optical logic is most often proposed using active optical components such as bistable devices using laser diodes and photodiodes, laser amplifiers operating with feedback to achieve bistability, self electro-optic effect devices (SEED), holograms and liquid crystal light valves. Some optical logic devices have included waveguides which have a non-linear refractive index so that an incoming light signal switches between output paths in accordance with the intensity of the signal.

The main problems with these devices are their complexity and in some cases the need for feedback. Also, it is not easy to monitor the optical signals.

SUMMARY OF THE INVENTION

In accordance with the present invention, an optical logic device comprises a source of substantially constant optical power; optical signal output means to which the optical power is fed, the optical signal output means having at least one output port and being responsive to electrical control signals selectively to generate optical signals on its at least one output port; optical signal input means to which an incoming optical signal is fed; and detection means for detecting the sense of a change in an optical signal fed to the optical signal input means and for generating a corresponding electrical control signal for controlling the optical signal output means, whereby the optical condition of the at least one output port is changed in the opposite sense.

This logic device is based on the principle of providing an electronic interface between the incoming optical signals and the outgoing optical signals. This means that no optical feedback is required and enables very fast component parts to be used. Potentially, very high speeds may be obtained, possibly of the order of a few tens of pico seconds. The power consumption of the device may be only a few tens of mW at several GBit/s operating speeds. This should be compared with commercial ECL which has typical power dissipation per gate of about 50 mW but at only a few hundred MBits/s.

A further advantage of the invention is that the optical power generation is remote from the other components of the device and thus the total dissipation is simply that of the detection means since in practice the dissipation of the optical signal output means will be negligible. Also, the operation of the device is not dependant upon the optical source wavelength to any marked degree. However, it is preferable if the source generates an incoherent optical beam so that destructive interference does not occur at the optical signal output means.

The logical value of the input optical signal and the output optical signal will be determined by external factors. In the simplest case, the presence of an optical signal may represent one logical condition while the absence of an optical signal may represent the complementary logical condition. Alternatively, a non-zero threshold may be set so that optical signals having an intensity greater than the threshold will represent one logical condition while optical signals having an intensity equal to or less than the threshold will represent the complementary condition. Furthermore, different definitions can be used for the input signals and the output signals.

Monitoring of the high speed optical signals may be achieved by fabricating low coupling ratio directional couplers in the optical paths where required. Such monitoring will not substantially compromise the logic circuit performance in contrast to what may occur with electronic logic at very high speed.

Preferably, the optical signal output means has two output ports, the optical conditions of the output ports being changed in opposite senses in response to the same electrical control signals.

This is particularly advantageous since the device will then produce logically complementary outputs automatically.

Preferably, the optical signal output means comprises a waveguide switch.

The detection means may comprise a photodetector which is conveniently electrically connected to a buffer limiting device. The advantage of providing a buffer limiting device will be explained in more detail below.

The invention in its simplest form defined above comprises an optical inverter. Any logic function can be obtained by using a combination of inversion and combining functions and in one particularly convenient arrangement, the device further comprises optical signal coupling means for coupling two input optical signals and for feeding the resultant coupled signal to the optical signal input means. This arrangement allows OR and NOR functions to be obtained. In this case, it is advantageous to provide a buffer limiting device since when the input optical signals both have a significant power value this could result in the detection means generating an undesirably high electrical control signal. The buffer limiting device prevents this from happening.

The basic building block of the invention can be used in a variety of ways to form more complex logic assemblies. In one example of such a logic assembly a common source of substantially constant optical power is provided. This is a particularly advantageous feature which enables long signal delays to be avoided and simplifies the overall construction of the assembly.

In this specification the term optical is intended to refer to that part of the electro-magnetic spectrum which is generally known as the visible region together with those parts of the infra-red and ultra-violet regions at each of the visible region which are capable of being transmitted by dielectric optical waveguides such as optical fibres.

The main advantages of the invention may be summarised as follows:

i. there is no optical feedback for the basic gate functions.

ii. it does not rely on bistability of optical devices iii. more complex logic functions are configurable from the basic gate using simple fibre or waveguide interconnections.

iv. it is conceivable that the optical logic block could be monolithically integrated.

BRIEF DESCRIPTION OF THE DRAWING

In order that the invention may be better understood, two examples of logic devices and an assembly including the devices according to the invention will now be described with reference to the accompanying drawings, in which.

DESCRIPTION OF THE PREFERRED EMBODIMENTS

Figure 1:
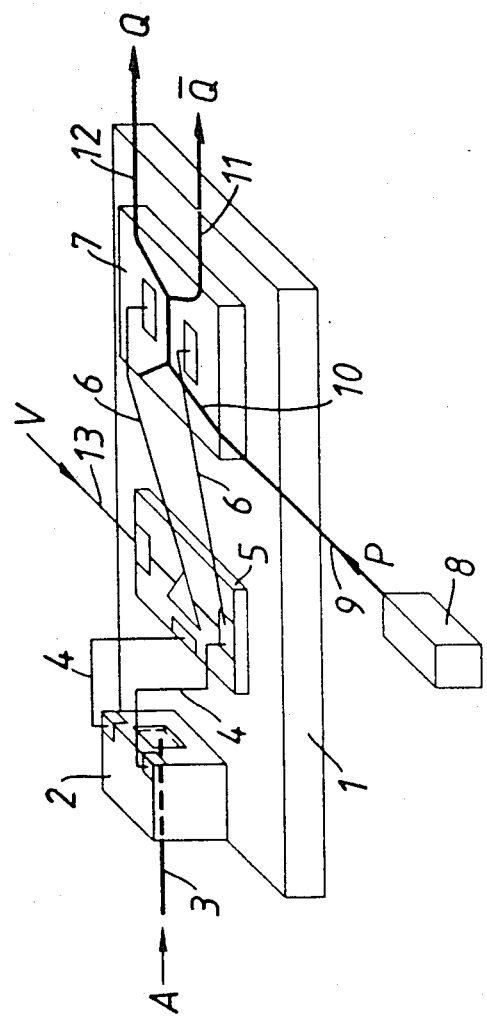
FIG. 1 is a schematic, perspective view of an optical inverter.

The optical inverter shown in FIG. 1 comprises a base 1 on which is mounted a photodetector 2. An optical fibre or planar waveguide 3 carries an input optical signal "A" which is applied to the photodetector 2. The photodetector 2 is connected via electrical wires 4 with a current to voltage buffer circuit 5 which is conveniently provided with a voltage limiting capability.

The voltage buffer circuit 5 is connected via electrical wires 6 to an optical waveguide switch 7 of conventional form. A laser assembly 8 generates an incoherent beam of optical radiation which is fed along an optical waveguide such as an optical fibre 9 to one input port 10 of the waveguide switch 7. The switch 7 has two output ports 11, 12 to which optical power received on the input port 10 is selectively coupled depending upon the potential difference on the wires 6. Electrical dc power is applied to the voltage buffer circuit 5 via a voltage input 13.

The optical signals output from the ports 11, 12 are arranged to have logical conditions which are respectively complemental and the same as the logical condition of the input optical signal "A". It is the optical signal output from the port 11 which is the more important since this is the inverse or logical complement of the input signal.

The transfer function and propagation delay of the inverter shown in FIG. 1 are dependant upon the logic levels required. The power P from the laser assembly 8 is required to be as high as possible to minimise the buffer circuit 5 complexity so that the propagation delay, a critical parameter in logic design, is minimised.

If the switching voltage for the waveguide switch is $V_s$, the photodetector responsivity is X and the buffer transresistance is $T\Omega$ then the optical logic power level $P_1$ is given by, $$p_1 = \frac{V_s}{XT} W$$

If $V_s=5$, $X=1A/W$ and $T=50\Omega$ then $P_1=100$ mW

This rather high level of optical power may be reduced if a higher buffer transresistance is provided. For instance for a transresistance of 500 $\Omega$ the optical power level reduces to 10 mW. The use of a detector with some internal gain, such as a photoconductor or avalanche photodiode, may allow reduction of the required optical power or transresistance.

The progagation delay is the addition of the delay through the fibre or planar waveguide inputs and outputs and the delay in the photodetector, buffer and switch. To minimise this delay an optimisation is required to set values for the optical power level and transresistance. The optical power (cw) could be generated in a high power cw laser or other light source and distributed to the inverters using fibres and/or planar waveguides.

Figure 2:
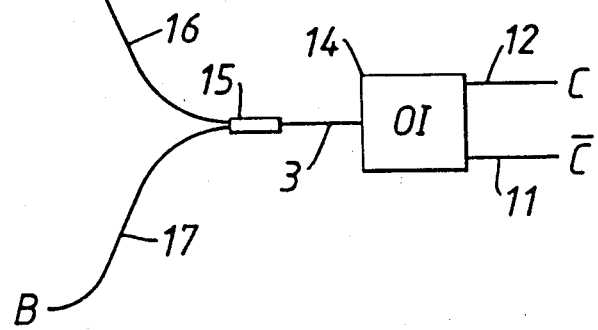
FIG. 2 illustrates an optical OR/NOR gate.

A logic device based on the device shown in FIG. 1 is illustrated in FIG. 2. The inverter of FIG. 1 is indicated at 14 and it will be seen that the optical fibre 3 is coupled with an optical coupler 15 having two inputs connected to optical fibres 16, 17 respectively.

The assembly shown in FIG. 2 operates on the two incoming optical signals "A" and "B" so that the optical signal output from the port 11 represents A OR B. The output from the port 12 represents A NOR B.

It should be understood that in a simple case one logical condition will be represented by the absence of an optical signal while the other logical condition is represented by the presence of an optical signal.

The truth table for the assembly shown in FIG. 2 is given below.

TABLE

| A | B | C |
|---|---|---|
| 0 | 0 | 0 |
| 0 | 1 | 1 |
| 1 | 0 | 1 |
| 1 | 1 | 1 |

Figure 3:
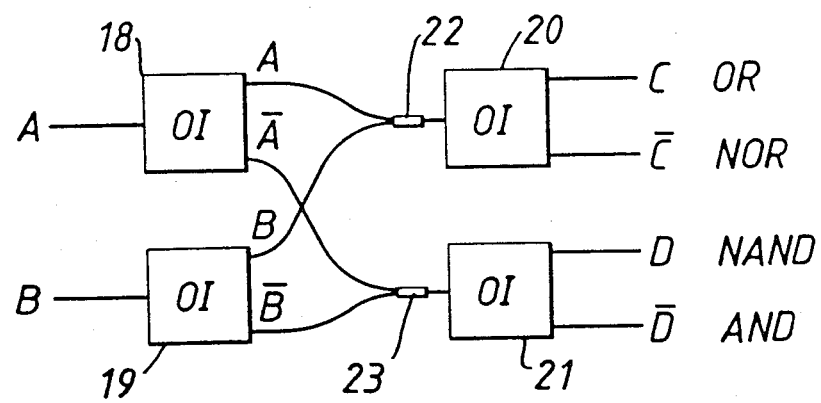
FIG. 3 illustrates a logic assembly providing OR, NOR, AND and NAND functions.

A logic assembly is illustrated in FIG. 3. This assembly comprises four optical inverters similar to that shown in FIG. 1 labelled 18–21. The optical inverters 18, 19 receive input optical signals A, B and generate corresponding logically complemental output signals A, $\overline{A}$; and B, $\overline{B}$ respectively. The A and B output signals are fed to an optical coupler 22 connected to the input port of the optical inverter 20. The outputs $\overline{A}$ and $\overline{B}$ are fed to an optical coupler 23 connected to an input port of the optical inverter 21. The optical inverters 20, 21 have a total of four output ports whose logical conditions represent A OR B, A NOR B, A NAND B, and A AND B respectively.

In a modification (not shown) the signals A, B could be split prior to reaching the invertors 18, 19 and be fed additionally directly to the coupler 22.

The optical inverter forming the basic building block of the invention is simple and it may be possible to fabricate arrays of the inverters which could be "hard fibred" for specific functions. This leads to the possibility that an assembly such as that shown in FIG. 3 could be reproduced as a monolithic array allowing a range of MSI or LSI functions to be achieved.

I claim:

1. An optical logic device comprising:
   a source of substantially constant optical power;
   optical signal output means to which the optical power is fed, the optical signal output means having at least one output port and being responsive to electrical control signals selectively to generate optical signals on its at least one output port;
   optical signal input means to which an incoming optical signal is fed; and
   detection means for detecting an optical signal fed to the optical signal input means and for generating a corresponding electrical control signal limited in magnitude to a predetermined maximum value by a buffer limiting device and coupled to control the optical signal output means so that the optical condition of the output port is changed in the opposite sense to the incoming optical signal.

2. A device according to claim 1, wherein the optical signal output means has two output ports, the optical conditions of the output ports being changed in opposite senses in response to the same electrical control signals.

3. A device according to claim 2, wherein the optical signal output means comprises optical coupling means having an input port to which optical power from the source is fed and is adapted to couple different proportions of the optical power to the two output ports in response to the electrical control signals.

4. A device according to claim 3, wherein the optical coupling means couples substantially all the optical power from the source to respective ones of its output ports.

5. A device according to claim 4, wherein the optical coupling means comprises a waveguide switch.

6. A device according to any of the preceding claims 1, 2, 3, 4 or 5 wherein the detection means comprises a photodetector.

7. A device according to any of the preceding claims 1, 2, 3, 4 or 5, wherein the source generates an incoherent optical beam.

8. A device according to any of the preceding claims 1, 2, 3, 4 or 5, further comprising optical signal coupling means for coupling two input optical signals and for feeding the resultant coupled signal to the optical signal input means.

9. An optical logic assembly comprising a first and a second pair of devices according to claim 2 wherein said second pair of devices each include optical signal coupling means for coupling two input optical signals and for feeding the resultant coupled signal to the optical signal input means, the output ports of the first pair of devices being coupled with the optical signal coupling means of the second pair of devices such that the logic functions defined by signals generated on the output ports of the second pair of devices represent OR, NOR, NAND, AND respectively relative to the optical signals input to the first pair of devices.

10. An optical logic assembly comprising a plurality of devices according to any of claims 1, 2, 3, 4 or 5, wherein a common source of substantially constant optical power is provided.

11. In an optical signal inverter having an optical-electrical-optical interface wherein an optical output signal is switched under control of an electrical control signal generated by detection of an incoming optical signal, the improvement comprising:

electrical signal buffering means for limiting the magnitude of said electrical control signal to no more than a predetermined maximum value which is below the value otherwise produced by incoming optical signal(s) in excess of a predetermined optical intensity.

* * * * *